United States Patent
Ross et al.

(10) Patent No.: US 9,499,420 B2
(45) Date of Patent: Nov. 22, 2016

(54) FORMULATIONS AND METHODS FOR REMOVING HEAVY METALS FROM WASTE SOLUTIONS CONTAINING CHELATING AGENTS

(71) Applicant: THATCHER COMPANY, Salt Lake City, UT (US)

(72) Inventors: Mark A. Ross, Salt Lake City, UT (US); Jeffrey W. Zidek, Salt Lake City, UT (US)

(73) Assignee: Thatcher Company, Inc., Salt Lake City, UT (US)

( * ) Notice: Subject to any disclaimer, the term of this patent is extended or adjusted under 35 U.S.C. 154(b) by 411 days.

(21) Appl. No.: 14/072,501

(22) Filed: Nov. 5, 2013

(65) Prior Publication Data
US 2014/0124447 A1    May 8, 2014

Related U.S. Application Data

(60) Provisional application No. 61/722,904, filed on Nov. 6, 2012.

(51) Int. Cl.
| | |
|---|---|
| *C02F 5/08* | (2006.01) |
| *C02F 5/12* | (2006.01) |
| *B01D 21/01* | (2006.01) |
| *C02F 1/52* | (2006.01) |
| *C02F 1/56* | (2006.01) |
| *C02F 1/68* | (2006.01) |

(Continued)

(52) U.S. Cl.
CPC .............. *C02F 1/5245* (2013.01); *C02F 1/281* (2013.01); *C02F 1/56* (2013.01); *C02F 1/683* (2013.01); *C02F 1/20* (2013.01); *C02F 1/28* (2013.01); *C02F 1/283* (2013.01); *C02F 1/44* (2013.01); *C02F 1/66* (2013.01); *C02F 1/70* (2013.01); *C02F 1/78* (2013.01); *C02F 2101/006* (2013.01); *C02F 2101/103* (2013.01); *C02F 2101/106* (2013.01); *C02F 2101/20* (2013.01); *C02F 2101/203* (2013.01); *C02F 2101/206* (2013.01); *C02F 2101/22* (2013.01); *C02F 2103/008* (2013.01); *C02F 2103/10* (2013.01); *C02F 2103/16* (2013.01); *C02F 2103/32* (2013.01); *C02F 2103/346* (2013.01); *C02F 2103/40* (2013.01); *C02F 2209/04* (2013.01); *C02F 2209/06* (2013.01)

(58) Field of Classification Search
None
See application file for complete search history.

(56) References Cited

U.S. PATENT DOCUMENTS

| | | |
|---|---|---|
| 3,767,572 A | 10/1973 | Bober et al. |
| 4,289,594 A | 9/1981 | Alpaugh et al. |

(Continued)

FOREIGN PATENT DOCUMENTS

| | | | | |
|---|---|---|---|---|
| CN | 101466855 | | 6/2009 | |
| CN | 101898876 A | * | 12/2010 | ............. C04B 28/26 |

(Continued)

OTHER PUBLICATIONS

Amer, Sultan I.; Simplified Removal of Chelated Metals; Metal Finishing; Apr. 2004; pp. 36-40.

*Primary Examiner* — Nam Nguyen
*Assistant Examiner* — Clare Perrin
(74) *Attorney, Agent, or Firm* — TraskBritt, P.C.

(57) ABSTRACT

Described are chemical formulations that remove heavy metals from waste solutions containing a chelating agent. Also disclosed are methods for removing heavy metals from waste solutions utilizing such chemical formulations.

23 Claims, 3 Drawing Sheets

(51) Int. Cl.
  *C02F 5/02* (2006.01)
  *B01D 15/00* (2006.01)
  *B03D 3/00* (2006.01)
  *C02F 1/70* (2006.01)
  *C02F 1/28* (2006.01)
  *C02F 1/20* (2006.01)
  *C02F 1/44* (2006.01)
  *C02F 1/66* (2006.01)
  *C02F 1/78* (2006.01)
  *C02F 101/00* (2006.01)
  *C02F 101/10* (2006.01)
  *C02F 101/20* (2006.01)
  *C02F 101/22* (2006.01)
  *C02F 103/00* (2006.01)
  *C02F 103/10* (2006.01)
  *C02F 103/16* (2006.01)
  *C02F 103/32* (2006.01)
  *C02F 103/34* (2006.01)
  *C02F 103/40* (2006.01)

(56) References Cited

U.S. PATENT DOCUMENTS

| | | |
|---|---|---|
| 4,332,687 A | 6/1982 | Daignault et al. |
| 4,512,900 A | 4/1985 | Macur et al. |
| 4,629,570 A | 12/1986 | Kennedy, Jr. |
| 4,741,831 A | 5/1988 | Grinstead |
| 4,846,978 A | 7/1989 | Leggett et al. |
| 5,160,631 A | 11/1992 | Frost et al. |
| 5,332,531 A | 7/1994 | Horwitz et al. |
| 5,451,327 A * | 9/1995 | Straten ............... C02F 1/5236 210/716 |
| 5,594,096 A | 1/1997 | Carey et al. |
| 6,177,571 B1 | 1/2001 | Fantucci |
| 6,436,358 B1 * | 8/2002 | Hsu ............... C22B 3/44 423/10 |
| 6,797,195 B1 | 9/2004 | Kreisler |
| 6,896,808 B1 | 5/2005 | Jay |
| 7,255,793 B2 | 8/2007 | Cort |
| 7,390,416 B1 | 6/2008 | Ede et al. |
| 7,749,302 B2 | 7/2010 | Hultholm et al. |
| 7,862,786 B2 | 1/2011 | Choi et al. |
| 8,211,389 B2 | 7/2012 | Zinn et al. |
| 2002/0088759 A1 | 7/2002 | Krulik et al. |
| 2005/0040108 A1 | 2/2005 | Jay |
| 2007/0248512 A1 | 10/2007 | Kawawa et al. |
| 2008/0038169 A1 | 2/2008 | Phan et al. |
| 2010/0213405 A1 | 8/2010 | Wensloff |

FOREIGN PATENT DOCUMENTS

| | | |
|---|---|---|
| GB | 1511858 | 5/1978 |
| JP | 11267667 | 10/1999 |
| JP | 2003275773 | 9/2003 |
| JP | 2003326228 | 11/2003 |
| JP | 4025841 | 12/2007 |
| JP | 2009112986 | 5/2009 |
| JP | 2009248540 | 10/2009 |
| JP | 4549579 | 9/2010 |
| JP | 2010240587 | 10/2010 |
| JP | 4823192 | 11/2011 |
| JP | 4823193 | 11/2011 |
| WO | 0134856 | 5/2001 |
| WO | 2007112562 | 10/2007 |

* cited by examiner

FORMULATIONS AND METHODS FOR REMOVING HEAVY METALS FROM WASTE SOLUTIONS CONTAINING CHELATING AGENTS

CROSS-REFERENCE TO RELATED APPLICATION

This application claims the benefit of U.S. Provisional Patent Application Ser. No. 61/722,904, filed Nov. 6, 2012, the disclosure of which is hereby incorporated herein in its entirety by this reference.

FIELD OF THE DISCLOSURE

This disclosure relates to chemical formulations for removing heavy metals from waste solutions containing chelating agents, and to methods for removing heavy metals from waste solutions containing chelating agent.

BACKGROUND

Many industrial processes produce waste solutions that are laden with heavy metals. These industrial processes include, among others, electroplating, galvanizing, anodizing, chelating, metal finishing, printed circuit board (PCB) manufacturing, semiconductor, magnetic disk manufacturing, mining operations, photo processing, fungicide manufacturing, food preparation, paper and pulp, textile, and oil refining. Examples of the heavy metal contaminants include copper, iron, gold, lead, nickel, silver, tin, zinc, chromium, cadmium, and arsenic. The presence of these heavy metals causes the waste solutions to be highly toxic and oftentimes corrosive and flammable.

In photographic processing waste solutions, the heavy metal ions are tightly bound by chelating agents such as ethylenediaminetetraacetate (EDTA), nitrilotriacetic acid (NTA), and thiosulfate. Waste solutions discharged from plants manufacturing printed circuit boards or the like typically contain heavy metal-chelating agent complexes (e.g., Cu-EDTA) that are derived from chemical copper plating solutions. Waste solutions generated from cleaning metals are produced in the service and maintenance of transportation vehicles and conveyances; military hardware and construction equipment (particularly on wheel and brake parts); aircraft engines; and in other aerospace and military applications. Such "chemical metal cleaning wastes" typically contain, for example, iron, copper, and other metals and heavy metals complexed with a chelating agent, such as EDTA.

Conventional methods for removing heavy metals from waste solutions involve reacting the heavy metals with hydroxide or sulfide compounds, and precipitating the resulting metal hydroxide or metal sulfide from the waste solutions. These methods work fairly well where the heavy metals are present in waste solutions as free ions. However, chelating agents have a high affinity for heavy metals. Thus, when a waste solution contains a chelating agent capable of forming a water-soluble complex with the heavy metal(s), conventional methods for removing the heavy metal(s) are typically ineffective to break up the strong complex of the chelating agent and heavy metal. Therefore, the heavy metal will remain in such a waste solution as part of a soluble complex with the chelating agent.

It has been thought necessary, therefore, to destroy the chelating agent in waste solutions, and thereby release heavy metals as free ions. Several oxidants have been used to destroy chelating agents. For example, U.S. Pat. No. 3,767,572 involves a method for treating photographic processing waste solutions containing heavy metal-EDTA complex by chlorinating the waste solutions with chlorine gas or hypochlorite solution under alkaline conditions to destroy the EDTA chelating agent. U.S. Pat. No. 4,332,687 involves oxidation and destruction of the chelating agent using peroxide and ozone. U.S. Pat. No. 4,846,978 involves that addition of magnesium hydroxide to waste solutions prior to ozonation to provide decomposition of chelating agent. In U.S. Pat. No. 4,289,594, ozonation is used in combination with ultraviolet light to oxidize and destroy the chelating agent. U.S. Pat. No. 4,512,900 describes a method for treating liquid wastes using hydrogen peroxide, followed by ozonation with simultaneous irradiation with ultraviolet light. In U.S. Patent Publication No. 2008/0038169, the waste solution is acidified and oxidized by nitric acid at an extreme temperature and pressure of 200° C. and 700 psig for about 60 minutes, thereby likewise destroying the chelating agent in the waste solution.

Another approach is based on ion replacement by using an excess amount of calcium hydroxide to provide free heavy metal ions. For example, U.S. Pat. No. 4,629,570 relates to a process for removing iron from an aqueous liquid containing soluble iron-EDTA complex. The process involves adjusting pH of the liquid to at least 12.5, adding a soluble calcium salt to facilitate the growth of insoluble iron hydroxide particles, and adding an alkali metal N,N-dimethyl- or N,N-diethyldithiocarbamate to precipitate the iron hydroxide solid from the liquid effluent.

Ion exchange resins may be used to isolate the heavy metals from the waste solutions containing a soluble heavy metal-chelating agent complex. This approach is, however, rather costly and time consuming.

BRIEF SUMMARY OF THE DISCLOSURE

Described herein are chemical formulations and methods that may be employed to remove at least one heavy metal from a waste solution, such as may be generated during any of a wide variety of processes. Such processes include, for example and without limitation, chemical metal cleaning; military installation; manufacturing of printed circuit boards; manufacturing of steels; manufacturing of chrome finishes, aircrafts, automobiles or ships; manufacturing of batteries; manufacturing of chemicals; manufacturing of semiconductors; manufacturing of medical equipment; manufacturing of dietary food supplements; photographic or X-ray processing; electronic plating; titanium pickle operations; electroless nickel operations; aluminum anodizing operations; metal plating and finishing; and mining.

In some embodiments, a chemical formulation for removing a heavy metal from a waste solution containing a chelating agent comprises an alkaline or alkaline earth sulfide, sodium aluminate, and water, wherein the chemical formulation has a pH of between about 10 and about 13.5. In some embodiments, such a chemical formulation comprises an alkaline or alkaline earth hydroxide. In particular embodiments, such a chemical formulation consists essentially of an alkaline or alkaline earth sulfide, an alkaline or alkaline earth hydroxide, sodium aluminate, and water.

In particular embodiments, a chemical formulation for removing a heavy metal from a waste solution containing a chelating agent comprises, for example and without limitation, from about 40% to about 45% by weight of an alkaline or alkaline earth sulfide solution (about 45% solids). In particular embodiments, a chemical formulation comprises from about 0% to about 10% by weight of an alkaline or alkaline earth hydroxide solution (about 45% solids). In particular embodiments, a chemical formulation comprises from about 10% to about 20% by weight of an sodium aluminate solution (about 40% solids). In particular embodiments, a chemical formulation comprises from and about 25% to 50% water by weight, based on the total weight of the formulation, wherein the formulation has a pH of between about 10 and about 13.5.

In some embodiments, a chemical formulation for removing a heavy metal from a waste solution containing a chelating agent is comprised within a kit, wherein the chemical formulation comprises an alkaline or alkaline earth sulfide, an alkaline or alkaline earth hydroxide, sodium aluminate, and water, wherein the chemical formulation has a pH of between about 10 and about 13.5. A kit comprising a chemical formulation for removing a heavy metal from a waste solution containing a chelating agent may comprise at least one of a coagulant (e.g., alum coagulant) and a flocculant (e.g., polymeric flocculant). In particular embodiments, a kit comprising a chemical formulation for removing a heavy metal from a waste solution containing a chelating agent consists essentially of a chemical formulation comprising an alkaline or alkaline earth sulfide, an alkaline or alkaline earth hydroxide, sodium aluminate, and water; and at least one of a coagulant and a flocculant.

In some embodiments, a chemical formulation for removing a heavy metal from a waste solution containing a chelating agent does not comprise one or both of an oxidizing agent and a dithiocarbamate-based compound. For example, a chemical formulation may comprise an oxidizing agent, but not a dithiocarbamate-based compound. By way of further example, a chemical formulation may comprise a dithiocarbamate-based compound, but not an oxidizing agent.

In certain embodiments, a method for removing a heavy metal from a waste solution containing a chelating agent comprises treating the waste solution with a chemical formulation for removing a heavy metal from a waste solution containing a chelating agent, at an oxidation reduction potential of between about −190 mV and about −450 mV, and at a pH of between about 7 and about 10. Such a method may comprise introducing at least one coagulant and/or flocculant to the treated waste solution.

DETAILED DESCRIPTION

Figure 1:
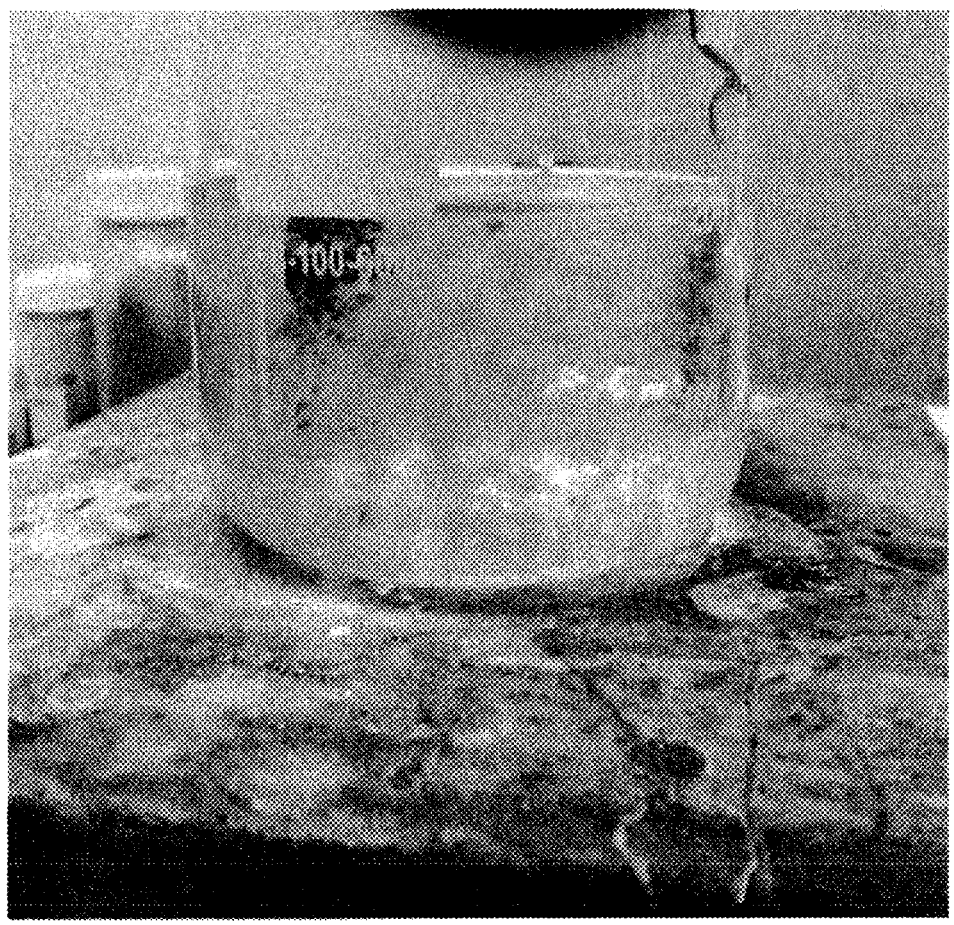
FIG. 1 includes a photograph showing floc formation of the exemplary treated metal finishing wastewater sample of Example 6.

Formulations and methods according to embodiments hereof provide the means to remove various heavy metals from a waste solution containing a chelating agent. Heavy metals that may be removed in particular embodiments include, for example and without limitation, iron, chromium, copper, nickel, zinc, lead, silver, cadmium, rhodium, barium, gold, platinum, palladium, tin, molybdenum, tungsten, manganese, arsenic, vanadium, bismuth, beryllium, mercury, cobalt, barium, antimony, selenium, thallium, thorium, or uranium. In examples, a heavy metal may be removed from any waste solution generated during a process, industrial or otherwise, which produces dissolved heavy metal-chelating agent complexes.

As used herein, the term "chelating agent" refers to a compound capable of forming a water-soluble complex with heavy metal. Non-limiting examples of such chelating agents include, without limitation, alkylenepolyamine polyacetic acids (e.g., ethylenediamine tetraacetic acid (EDTA), diethylenetriamine pentaacetic acid (DEPA), and 1,2-cyclohexane diamine tetraacetic acid (CDTA)); nitrilotriacetic acid (NTA); thiosulfate; iminodiacetic acid; alkylenepolyamino polycarboxylic acids; soaps; amines; citrates; carboxylic acids; diamines; triamines; ammonium nitrate; and gluconates.

In embodiments, a chemical formulation for removing a heavy metal from a waste solution containing a chelating agent participates in a chemical reaction converting a heavy metal-chelating agent complex to metal sulfide, which precipitates out of the treated waste solution. It is important to note that other reactions may take place between components of a waste solution and the disclosed chemical formulation in methods according to some embodiments. The reactions described herein are exemplary, and are not to be construed as being the only reactions that occur.

A metal alkaline or alkaline earth sulfide suitable for use in some embodiments may include, for example and without limitation, sodium sulfide, sodium hydrosulfide (NaSH), potassium sulfide, calcium sulfide, and combinations thereof. In particular embodiments, an alkaline or alkaline earth sulfide is present in a chemical formulation at about 45% solids in an amount from about 40% to about 45% by weight, based on the total weight of the formulation. In particular embodiments, an alkaline or alkaline earth sulfide is present in an amount slightly in excess of the stoichiometric amounts required to react with the heavy metals present in the waste solutions.

For example, a chemical formulation for removing a heavy metal from a waste solution containing a chelating agent may comprise NaSH (flake) in an amount of about 25 w/w % (e.g., 25%, 25.5%, 26%, 26.5%, 27%, 27.5%, 28%, and 29%). In some embodiments, the alkaline earth sulfide is solid NaSH (flake). NaSH flake has been found to be a very high-purity compound, as it is available from commercial suppliers, and its use results in a stable chemical formulation for removing a heavy metal from a waste solution containing a chelating agent, which stable formulation may not be obtainable with other compounds. However, in particular embodiments, liquid NaSH, which is far more readily available than NaSH flake, may be employed. For example, a chemical formulation for removing a heavy metal from a waste solution containing a chelating agent may comprise liquid NaSH (e.g., in a 30% solution) in an amount of about 60 w/w % (e.g., 60%, 61%, 61.5%, 62%, 62.5%, 63%, and 64%). For example, high-purity NaSH flake may be prepared in a liquid stock solution, and then combined with other components to produce the chemical formulation for removing a heavy metal from a waste solution containing a chelating agent. In some embodiments, a NaSH flake is comprised within a chemical formulation for removing a heavy metal from a waste solution containing a chelating agent, wherein the NaSH flake is at least about 70% pure, with an amount of Na2S of less than about 10% (e.g., 8% or less, and 5.5% or less).

An metal alkaline or alkaline earth hydroxide suitable for use in some embodiments may include, for example and without limitation, sodium hydroxide, calcium hydroxide, potassium hydroxide, magnesium hydroxide, and combinations thereof. For example, a chemical formulation for removing a heavy metal from a waste solution containing a chelating agent may comprise an alkaline earth hydroxide (e.g., NaOH) that is introduced into the formulation as part of a sodium aluminate solution, which may contribute to a more stable formulation. In some examples, a sodium aluminate solution used in the preparation of a chemical formulation for removing a heavy metal from a waste solution containing a chelating agent may be a 32% sodium aluminate solution further comprising 7% NaOH. In particular embodiments, the alkaline or alkaline earth hydroxide is present in the chemical formulation at about 45% solids in an amount up to 10% by weight, based on the total weight of the formulation.

In some embodiments, the use of a chemical formulation for removing a heavy metal from a waste solution containing a chelating agent may be followed by the use of a coagulant, a flocculant, or both of the foregoing, to facilitate the precipitation of heavy metal sulfide from the treated waste solution. In some examples, the coagulant and/or flocculant is present in an amount sufficient to facilitate particle growth of the heavy metal sulfide floc. For example, the coagulant and/or flocculant may be used in an amount of from about 0.05% to about 5% weight. According to the foregoing, some embodiments provide a kit of parts for performing a method for removing a heavy metal from a waste solution containing a chelating agent, wherein the kit of parts comprises a chemical formulation for removing a heavy metal from a waste solution containing a chelating agent; and at least one coagulant and/or flocculant. Such a kit of parts may comprise instructions that supply a list of steps and/or parameters for using the kit components to remove a heavy metal from the waste solution.

Various coagulating agents may be used in particular embodiments, including, for example and without limitation, an aluminum salt (e.g., aluminum sulfate [$Al_2(SO_4)_3$], aluminum chloride, sodium aluminate, and polyaluminum chloride); activated silica; ferric salts (e.g., ferric chloride and ferric hydroxide); ferrous salts; calcium chloride; magnesium chloride; and certain colloidal clays (e.g., bentonite). For example, a chemical formulation for removing a heavy metal from a waste solution containing a chelating agent may comprise sodium aluminate (e.g., in a 39% solution) in an amount of about 20 w/w % (e.g., 18%, 18.5%, 19%, 19.5%, 20%, 20.5%, 21%, and 22%).

In particular embodiments, a soluble, high molecular weight polymeric flocculant is used to facilitate flocculation and separation of the heavy metal sulfide from the treated waste solution. In some examples, at least one flocculant may be present in an amount of, for example and without limitation, from about 0.5 ppm to about 10 ppm.

Suitable polymeric flocculants may be an anionic polymer, a cationic polymer, a nonionic polymer, or a mixture thereof. Non-limiting examples of suitable anionic polymeric flocculants in particular embodiments include anionic polyacrylamide; poly(acrylic acid); and poly(styrenesulfonic acid) (PSSA). Non-limiting examples of suitable cationic polymeric flocculants in particular embodiments include cationic polyacrylamide; poly(diallyldimethyl ammonium chloride) (polyDADMAC); cationic polysaccharides; polyethylene-imines; and polyamines. Non-limiting examples of suitable nonionic polymeric flocculants in particular embodiments include poly(ethylene oxide) and polyacrylamide.

In some examples, a method for removing a heavy metal from a waste solution containing a chelating agent may utilize an inorganic flocculant (e.g., aluminum sulfate and polyaluminum chloride). In particular embodiments, a soluble inorganic flocculant is used to facilitate flocculation and separation of the heavy metal sulfide from the treated waste solution. For example, aluminum sulfate may be added to generate a large floc particle, and an anionic polymer may also be added to agglomerate the floc particle into a large mass that may be readily separated from the treated wastewater and easily filtered.

In some embodiments, a method for removing a heavy metal from a waste solution containing a chelating agent comprises treating the waste solution with a chemical formulation comprising an alkaline or alkaline earth sulfide, sodium aluminate, and water, for example, wherein the chemical formulation does not comprise one or both of an oxidizing agent and a dithiocarbamate-based compound. In particular embodiments, the chemical formulation comprises an alkaline or alkaline earth hydroxide. In some embodiments, one or more coagulant(s) and/or flocculant(s) (e.g., an anionic polymer and aluminum sulfate) are then added to facilitate flocculation. Some embodiments comprise separating a solid precipitant containing a heavy metal from the treated waste solution, for example, to produce waste effluent.

The methods herein may be adjusted according to the discretion of one of skill in the art, and in view of particular applications, by controlling the oxidation-reduction potential (ORP) and pH of the treatment. In certain examples, the oxidation-reduction potential (ORP) and pH affect the efficiency of the generation and precipitation of heavy metal sulfide from the waste solution.

In some embodiments, a method for removing a heavy metal from a waste solution containing a chelating agent comprises treating the waste solution with a chemical formulation for removing a heavy metal from a waste solution containing a chelating agent until the waste solution reaches an oxidation reduction potential of between about −190 mV and about −450 mV (as may be determined utilizing an electrode, for example, a Ag/AgCl electrode), and at a pH of between about 7 and about 10. In particular embodiments, the method comprises treating the waste solution with the chemical formulation until the waste solution reaches an oxidation reduction potential of between about −300 mV to −450 mV.

In some embodiments, a method for removing a heavy metal from a waste solution containing a chelating agent comprises separating solid precipitates including a heavy metal sulfide from the treated solution using an active separation process or a passive separation process. Accordingly, any known method for separating the solid precipitates from aqueous liquid may be used, including, for example and without limitation, high pressure filtration techniques; centrifugation techniques; settling ponds; conventional clarification; inclined plate clarification; and combinations of the foregoing.

In some embodiments, a waste effluent (for example, as obtained by separating a precipitate from a treated waste solution) may be subjected to a further waste treatment process. Examples of such further waste treatment processes include, for example and without limitation, irradiation; adsorption using adsorbent beds; membrane filtration; air stripping; and ozonation. For example, a waste effluent may be treated with organic adsorbent, inorganic adsorbent, or both. For example, the waste effluent may be treated with activated carbon to remove organic contaminants from the effluent and to decolorize the effluent.

In some embodiments, a method for removing a heavy metal from a waste solution containing a chelating agent is a continuous process, for example, in which the heavy metal is continuously removed from a flowing stream of the waste solution. For example, a chemical formulation for removing a heavy metal from a waste solution containing a chelating agent may be added to a flowing stream of waste solution until the waste solution reaches a target oxidation reduction potential, and one or more coagulant(s) and/or flocculant(s) may be added subsequently to the flowing stream. In some embodiments, a method for removing a heavy metal from a waste solution containing a chelating agent is a discontinuous process, for example, a step-wise process in which the heavy metal is removed from the waste solution in one or more discrete steps.

Some embodiments allow the reduction of a level of a dissolved heavy metal in a waste solution containing chelating agent to a level less than or equal to that permitted by governmental regulations pertaining to waste disposal. Exemplary methods herein offer a safe, cost effective, and/or efficient means for removing heavy metals from waste solutions containing chelating agent in comparison to a conventional method. Furthermore, exemplary methods herein utilize a single chemical formulation that effectively removes heavy metals from waste solutions without requiring any dangerous chemical to destroy chelating agents.

Aspects of some embodiments of the invention are illustrated in Examples 1-22. For example and without limitation, a method for removing a heavy metal from a waste solution containing a chelating agent may exhibit superior efficiency for the removal of a heavy metal from a waste solutions containing a chelating agent, compared to a conventional method that includes a chelant destroyer. Furthermore, as demonstrated in Examples 8 and 17-22, a chemical formulation for removing a heavy metal from a waste solution containing a chelating agent may be capable of reducing chromium (VI) ions in the waste solutions. Therefore, such a method may not require a pre-treatment step of reducing chromium (VI) ions (for example, by pre-treating with sodium metabisulfite), as is typically required in conventional methods.

EXAMPLES

Example 1

Chemical Formulation for Removing a Heavy Metal from a Waste Solution Containing a Chelating Agent Chemical formulations comprising NaSH flakes were prepared for removing a heavy metal from a waste solution containing a chelating agent. High-purity NaSH flakes were found to yield a stable formulation. Lesser-purity liquid NaSH did not yield a suitably stable formulation. An example of the product data for a sufficiently pure NaSH flake composition is set forth in Table 1.

TABLE 1

Product data information for Sodium Hydrosulfide (flake).

|  | Specification |  | Typical |
|---|---|---|---|
| NaHS* | 70% | MIN | 71% |
| Na2S | 8% | MAX | 5.5% |
| Iron (Fe) | 10 ppm | MAX | 5.4% |
| Insoluble in $H_2O$ (%) | 0.20% |  | 0.02% |
| Particle Size |  |  |  |
| on mesh 4 |  |  | 60% |
| on mesh 18 |  |  | 95% |
| on mesh 100 |  |  | 99% |
| Bulk Density (g/cc) | 0.6-0.7 |  |  |

*Includes Na2S calculated as NaHS-Hydrated-Not less than 25% water of crystallization Examples of chemical formulations that were prepared for removing a heavy metal from a waste solution containing a chelating agent are those in Table 2. The formulations were prepared by weighing and adding $H_2O$ to a drum; weighing and adding sodium aluminate to the drum; weighing and adding NaSH to the drum; and mixing the contents of the drum for about 10 minutes. Particular caution was observed in handling NaSH flakes. Samples of the mixed formulation were submitted to a laboratory for analysis (e.g., to verify a uniform solution without undissolved solids).

TABLE 2

Chemical formulations.

| Compound | Form | Formulation: | | | | |
|---|---|---|---|---|---|---|
|  |  | 1 | 2 | 3 | 4 | 5 |
|  |  | amount (w/w %) | | | | |
| DI $H_2O$ |  |  | 53.80 | 17.98 |  |  | 17.98 |
| soft water |  |  |  | 27.62 | 37.50 |  |
| Sodium Aluminate | 32% solution (with 7% NaOH) | 20.00 | 20.00 |  |  | 20.00 |
| NaOH | 7% |  |  |  |  |  |
| NaSH | flake | 26.20 |  |  |  |  |
| NaSH | 30% solution |  | 62.02 | 62.50 | 62.50 |  |
| NaSH | 30% solution from flake |  |  |  |  | 62.02 |
| 50% caustic |  |  |  |  | 9.88 |  |

The chemical formulations of Table 2 were tested to determine the stability and crystallization of the formulations. Table 3.

TABLE 3

Stability and crystallization of formulations comprising soft water (form. nos. 3 and 4) vs. DI water (no. 5); NaSH as a by-product (nos. 3 and 4) vs. extremely pure (no. 5); and sodium aluminate (no. 5) vs. caustic soda (nos. 3 and 4).

|  | 4° C. for 1 day | | −17° C. for 1 day |
|---|---|---|---|
| Formulation 3 | uniform | uniform solid | crystallized |
| Formulation 3 (90%) in water (10%) |  | uniform | crystallized |
| Formulation 3 (80%) in water (20%) |  | uniform | uniform |
| Formulation 4 | uniform | uniform solid | uniform |
| Formulation 4 (90%) in water (10%) |  | uniform | slight crystallization |
| Formulation 4 (80%) in water (20%) |  | uniform | slight crystallization |
| Formulation 5 | uniform | uniform uniform | crystallized |
| Formulation 5 (90%) in water (10%) |  | uniform | mostly crystallized |
| Formulation 5 (80%) in water (20%) |  | uniform | mostly crystallized |

Example 2

Removing a Heavy Metal from a Wastewater Generated During the Manufacture of Medical Equipment A method was performed to remove heavy metals from wastewater generated from the manufacturing of medical equipment, prior to discharging the wastewater to a local municipality for further treatment. The wastewater from the medical equipment manufacturing process contained molybdenum, cadmium, chromium, copper, lead, nickel, zinc and silver. The wastewater was adjusted to pH of about 7. A chemical formulation (e.g., formulations 1-5; see Table 2) was added to the wastewater until an oxidation reduction potential was obtained of between around −300 mV and about −450 mV, at a pH of from about 7 to 9. Then, the treated wastewater was processed through an inclined plate clarifier for solid/liquid separation.

The method showed a reduction of heavy metals in the wastewater to acceptable levels placed upon the manufacturing facilities by the municipality: metal discharge limits of molybdenum at 5.52 mg/L, cadmium 0.69 mg/L, chromium 2.77 mg/L, copper 3.38 mg/L, lead at 0.69, nickel at 1.90 mg/L, silver at 0.43 mg/L and zinc at 2.61 mg/L.

For comparison, a conventional method was performed by treating the wastewater with a chlorine-based oxidizer, to destroy chelating agents in the wastewater and free heavy metal ions, followed by precipitating the free heavy metal ions with sodium dimethyldithiocarbamate and a metal salt coagulant.

The conventional chelant destroying method showed a similar reduction in heavy metals as the test method, but the test method provided this reduction at a greatly reduced cost, increased efficiency and enhanced reliability.

Example 3

Removing a Heavy Metal from a Wastewater Generated During the Manufacture of a Dietary Supplement A method was performed to remove heavy metals from wastewater generated from manufacturing of dietary food supplements (e.g., vitamin or other dietary supplements). The wastewater contained high levels of zinc (approaching 1,000 mg/L) and chrome (greater than 5,000 mg/L), as well as high concentrations of citrates, gluconates, and ammonium chelating agents (generally at levels greater than 500 mg/L). The wastewater was adjusted to a pH of about 7. A chemical formulation including sodium aluminate (e.g., formulations 1, 2, 4, and 5; see Table 2) was added to the wastewater to an oxidation reduction potential of between around −300 mV and about −450 mV, at a pH of from about 7 to 9. Formulation 5 was used in particular trials. Once the target ORP was achieved, anionic polymer was added. Then, the treated wastewater was processed through a plate and frame press for solid/liquid separation.

For comparison, a conventional method was performed by treating the wastewater with sulfuric acid, caustic soda, dimethyl dithiocarbamate, and aluminum chlorohydrate.

The test method provided a reduction of heavy metals meeting the discharge standard for total zinc, at 4.57 mg/L and chromium at 2.0 mg/L, at a much lower cost and improved efficiency compared to the conventional method.

Example 4

Removing a Heavy Metal from a Wastewater from a Military Installation

A method was performed to remove heavy metals from wastewater generated at a military installation, prior to discharging the wastewater to a local publicly owned treatment works (POTW), which is a term used for a sewage treatment plant that is owned, and usually operated, by a government agency. The wastewater contained cadmium, chromium, nickel and iron. The wastewater was adjusted to a pH of about 7. A chemical formulation including sodium aluminate (e.g., formulations 1, 2, 4, and 5; see Table 2) was added to the wastewater to an oxidation reduction potential of between around −300 mV and about −450 mV, wherein chrome VI ($Cr^{6+}$) was reduced to chrome III ($Cr^{3+}$). Formulation 5 was used in particular trials. When the target ORP was achieved, anionic polymer was added. Then, the pH of the wastewater was adjusted to about 7.5-9.0, and the wastewater was processed through a conventional clarifier for solid/liquid separation. The waste effluent was subjected to a volatile organic stripping process using a VOC air stripper tower, and then to adsorption with activated carbon before a final discharge.

For comparison, a conventional method was performed by treating the wastewater with chlorine-based chelant destroyer, a pH controller for metal hydroxide formation, sodium sulfide for metal sulfide precipitation, and iron sulfate for coagulation.

The test method was much more effective than the conventional method in removing cadmium, chromium, nickel, and iron from the wastewater. Table 4.

TABLE 4

Heavy metal contents in the wastewater before and after treating the wastewater with the test method.

| Metal | Concentration Before Treatment via the Test Method (mg/L) | Concentration After Treatment via the Test Method (mg/L) |
| --- | --- | --- |
| Cadmium | 0.032 | 0.005 |
| Chromium | 0.119 | 0.058 |
| Nickel | 0.160 | 0.025 |
| Iron | 0.504 | 0.260 |

Example 5

Removing Cadmium from Wastewater

A method was performed to remove cadmium from wastewater at a wastewater treatment facility, wherein about 9,000 gallons of wastewater contained about 180 mg/L of cadmium. The wastewater was adjusted to a pH of about 7. A chemical formulation including sodium aluminate (e.g., formulations 1, 2, 4, and 5; see Table 2) was added to the wastewater at a dosage rate of 267 mg/L, to an oxidation reduction potential of between about −300 mV and about −450 mV, at a pH between about 7 to 9. Formulation 5 was used in particular trials. Once the target ORP was achieved, anionic polymer was added. Then, the treated wastewater was processed through a 2.5 micron bag filter for solid/liquid separation.

This test method reduced the concentration of cadmium in the wastewater from 55 mg/L to only 0.3 mg/L.

Example 6

Removing Nickel from Wastewater Containing Nickel Sulfamate Electroplating Solution A method was performed to remove nickel from wastewater containing nickel sulfamate electroplating solution, and its removal efficiency was compared to that of a conventional method. The wastewater contained nickel sulfamate electroplating solution, oxalic acid, aluminum stripping solutions, rust stripping solutions, and citrus-based degreasing solutions. The wastewater was adjusted to a pH of about 7. A chemical formulation including sodium aluminate (e.g., formulations 1, 2, 4, and 5; see Table 2) was added to the wastewater to an oxidation reduction potential of about −450 mV, and a pH of about 8.5. Formulation 5 was used in particular trials. Once the target ORP was achieved, anionic polymer was added. Then, the treated wastewater was processed through a conventional clarifier for solid/liquid separation.

For comparison, the conventional method included performing acidic reduction through the addition of sulfuric acid to achieve a pH of 3, followed by addition of the strong reductant metabisulfite, addition of a solution of sodium hydroxide to raise the pH to 9, and addition of an anionic polymer to accelerate the flocculation of heavy metal hydroxide.

The test method reduced the nickel concentration in the wastewater from about 1300 mg/L to only 0.25 ppm, while the conventional method did not reduce the nickel concentration to any lower than 18 ppm.

Example 7

Removing a Heavy Metal from a Metal Finishing Wastewater

The removal of heavy metal was tested in four 200 mL wastewater samples from traditional metal finishing wastewater, using a method that included: 1) acidic reduction of chromium (VI) through the addition of sulfuric acid to achieve a pH of 3.0, followed by addition of a strong reductant (e.g., metabisulfite); 2) raising the solution pH to 9.0 through the addition of caustic (NaOH); and 3) addition of an anionic polymer to accelerate floc formation. FIG. 1 shows visual results demonstrating the rapid generation of floc particles, which indicated that the wastewater had no significant amount of chelator present.

Example 8

Removing a Heavy Metal from a Metal Finishing Wastewater

The removal of heavy metal was tested in four 200 mL wastewater samples from traditional metal finishing wastewater. The initial pH and oxidation-reduction potential (ORP) of the wastewater samples were 9.8 and +45 mV, respectively. The pH of the wastewater samples was not reduced, and no metabisulfite was added to the wastewater to reduce chromium (VI) to chromium (III). A sufficient amount of a formulation including sodium aluminate (e.g., formulations 1, 2, 4, and 5; see Table 2) was added to samples to lower the ORP level to −300 mV and −400 mV, while maintaining a pH of at least 9.0. Formulation 5 was used in particular trials. Once the target ORP was achieved, anionic polymer was added. Duplicate samples were taken from each 200 mL treated wastewater sample for analysis.

For comparison, a conventional method was performed, including acidic reduction of chromium (VI) through the addition of sulfuric acid to achieve a pH of 3, followed by addition of the strong reductant metabisulfite, addition of a solution of sodium hydroxide to raise the pH to 9, and addition of an anionic polymer to accelerate the flocculation of heavy metal hydroxide.

Figure 2:
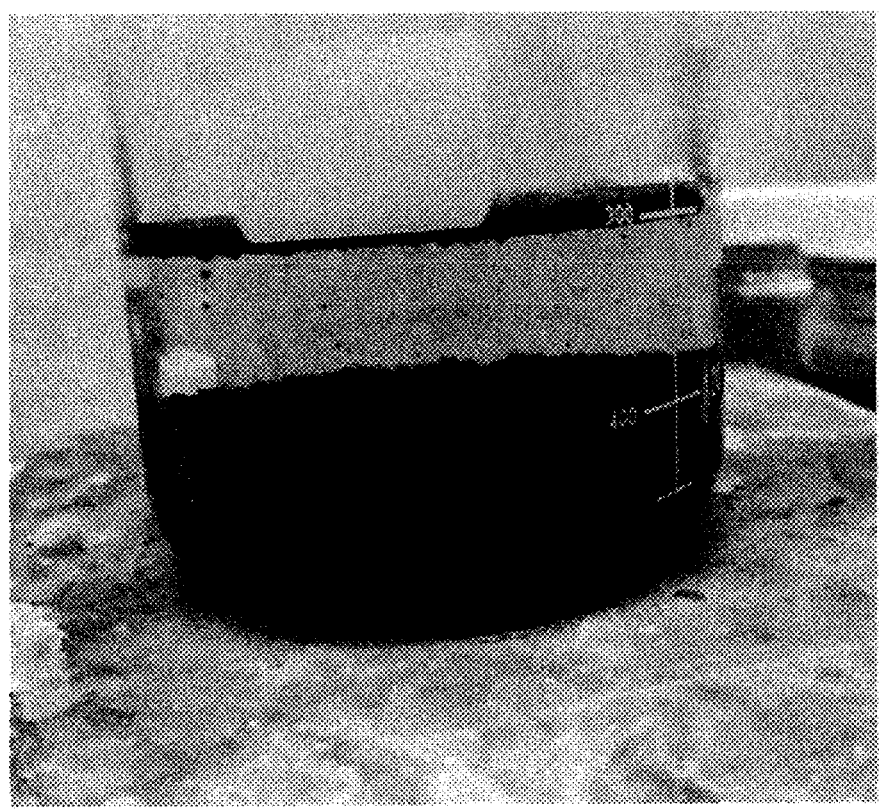
FIG. 2 includes a photograph showing floc formation of the exemplary treated metal finishing wastewater sample of Example 7.

The wastewater treated with the test method yielded a black precipitate that settled quickly to the bottom of the container, as shown in FIG. 2. Within a few minutes, a clear liquid was observed above the concentrated black solids.

The study indicated that the test method was at least as effective in removing cadmium, nickel, nickel, and zinc from metal finishing wastewater as the conventional method. Furthermore, lowering the ORP level from −300 mV to −400 mV had little effect on the treatment performance, except for the removal of chromium. By reducing the ORP level −300 mV to −400 mV, chromium removal was enhanced by over ten-fold. This suggested that the novel method may have sufficient reducing power to reduce chromium (VI) to chromium (III) under alkaline conditions. Table 5.

TABLE 5

Effectiveness of heavy metal removal using the test method in comparison to the conventional method. The control sample consisted of the wastewater without any treatment.

| Sample | Concentration (ppm) | | | |
| --- | --- | --- | --- | --- |
| | Cadmium | Chromium | Nickel | Zinc |
| Control | 0.028 | 7.006 | 0.016 | 0.000 |
| Control | 0.025 | 6.597 | 0.017 | 0.000 |
| Conventional Method | 0.016 | 1.073 | 0.012 | 0.017 |
| Conventional Method | 0.012 | 1.094 | 0.013 | 0.020 |
| Novel Method at −300 mV | 0.009 | 4.997 | 0.010 | 0.000 |
| Novel Method at −300 mV | 0.005 | 4.997 | 0.012 | 0.000 |
| Novel Method at −400 mV | 0.010 | 1.370 | 0.009 | 0.001 |
| Novel Method at −400 mV | 0.011 | 1.045 | 0.013 | 0.003 |

Example 9

Removing a Heavy Metal from a Metal Finishing Wastewater

The removal of heavy metal was tested in four 200 mL wastewater samples from traditional metal finishing wastewater. The initial pH and oxidation-reduction potential (ORP) of the wastewater samples were 9.78 and +45 mV, respectively. The samples had a distinctive yellow color suggesting the presence of chromium (VI). Acidic chromium (VI) reduction was first achieved by adding metabisulfite, followed by lowering the pH to 3.0. After completion of the acidic chromium reduction process, the pH of the sample was raised to approximately 7.0 using caustic. A sufficient amount of a formulation including sodium aluminate (e.g., formulations 1, 2, 4, and 5; see Table 2) was added to the samples to lower the ORP level to −300 mV and −400 mV, respectively. Formulation 5 was used in particular trials. Once the ORP level reached its target level, anionic polymer was added, and the pH was adjusted to 9.0, if necessary, through the addition of caustic (only necessary for samples adjusted to an ORP of −300 mV).

The results of these tests were then compared to the results achieved through a conventional wastewater treatment. Duplicate analytical samples were taken from each 200 mL wastewater sample. The test results are summarized in Table 6.

TABLE 6

Effectiveness of heavy metal removal using the test method in comparison to the conventional method. The control sample consisted of the wastewater without any treatment.

| Sample | Concentration (ppm) | | | |
|---|---|---|---|---|
|  | Cadmium | Chromium | Nickel | Zinc |
| Control | 0.022 | 6.692 | 0.017 | 0.000 |
| Control | 0.024 | 6.817 | 0.017 | 0.000 |
| Conventional Method | 0.005 | 0.059 | 0.005 | 0.012 |
| Conventional Method | 0.009 | 0.054 | 0.003 | 0.010 |
| Novel Method at −300 mV | 0.000 | 0.152 | 0.008 | 0.012 |
| Novel Method at −300 mV | 0.000 | 0.169 | 0.010 | 0.011 |
| Novel Method at −400 mV | 0.002 | 0.012 | 0.008 | 0.011 |
| Novel Method at −400 mV | 0.004 | 0.014 | 0.010 | 0.010 |

Results from Table 6 indicated that a small addition of the test formulation resulted in a rapid decrease in the solution ORP level. Although both the conventional method and the test method yielded metal concentrations that were in compliance with current regulatory standards, the test method seemed to be more efficient at chromium removal, particularly at the lower ORP level (i.e., −400 m V). This indicated that the reducing strength of the test formulation may be sufficient to reduce chromium (VI) to chromium (III) under alkaline conditions.

Example 10

Removing a Heavy Metal from a Metal Finishing Wastewater

The removal of heavy metal was tested in four 200 mL wastewater samples from traditional metal finishing wastewater. The initial pH and oxidation-reduction potential (ORP) of the wastewater samples were 6.2 and +215 mV, respectively. The samples had a distinctive yellow color suggesting the presence of chromium (VI). Acidic chromium (VI) reduction was first achieved by adding metabisulfite. After completion of the acidic chromium reduction process, the pH of the sample was raised to approximately 7.0 using caustic. A sufficient amount of the test formulation including sodium aluminate (e.g., formulations 1, 2, 4, and 5; see Table 2) was added to the samples to lower the ORP level to −300 mV and −400 mV, respectively. Formulation 5 was used in particular trials. The results of these tests were then compared to the results achieved through a convention wastewater treatment. Three drops (about 0.06 mL) of alum were added to each of the samples treated with the test method. Two drops (about 0.04 mL) of anionic polymer were added to facilitate floc formation. Duplicate analytical samples were taken from each 200 mL wastewater sample. The test results are summarized in Table 7.

TABLE 7

Effectiveness of heavy metal removal using the test method in comparison to the conventional method. The control sample consisted of the wastewater without any treatment.

| Sample | Concentration (ppm) | | | |
|---|---|---|---|---|
|  | Cadmium | Chromium | Nickel | Zinc |
| Control | 0.136 | 12.290 | 0.180 | 0.038 |
| Control | 0.134 | 11.810 | 0.176 | 0.056 |
| Conventional Method | 0.016 | 0.236 | 0.055 | 0.026 |
| Conventional Method | 0.039 | 0.233 | 0.054 | 0.034 |
| Test Method at −300 mV | 0.000 | 0.054 | 0.072 | 0.010 |
| Test Method at −300 mV | 0.000 | 0.045 | 0.068 | 0.010 |
| Test Method at −400 mV | 0.004 | 0.022 | 0.068 | 0.007 |
| Test Method at −400 mV | 0.003 | 0.023 | 0.063 | 0.011 |

The results indicated that addition of a small amount of alum did not significantly improve the removal efficiencies of the selected heavy metals when treating the influent wastewater via the test method. In all cases, the test method yielded significantly lower concentrations of heavy metals when compared to the conventional method.

Example 11

Removing a Heavy Metal from a Metal Finishing Wastewater

Supplemented with Nickel Sulfamate Electroplating Solution

The removal of heavy metal was tested in four 200 mL wastewater samples from traditional metal finishing wastewater. The initial pH and oxidation-reduction potential (ORP) of the wastewater samples were 7.4 and +153 mV, respectively. The wastewater samples were supplemented with nickel sulfamate electroplating solution. Approximately 5 mL of nickel sulfamate was added to 495 mL of the wastewater, to produce a 1:100 dilution. The pH and ORP level in the commingled solution was measured to be 6.9 and +158 mV, respectively. Chromium (VI) reduction was achieved through acidic reduction, via application of sulfuric acid (to lower pH to 3.0), followed by the application of metabisulfite. Following the chromium reduction process, the pH of the solution was raised to approximately 7.0 using caustic, after which a test formulation including sodium aluminate (e.g., formulations 1, 2, 4, and 5; see Table 2) was added. Formulation 5 was used in particular trials. Because the difference in metals removal found between wastewater treatments with the test formulation at −300 mV versus −400 mV was not significant, it was decided to evaluate the treatment of chelator solutions at −300 mV only for the present tests. A sufficient amount of the test formulation was added to samples to lower the ORP level to −300 mV. The results of these tests were then compared to the results achieved through a convention treatment method. Three drops (about 0.06 mL) of alum were added to each of the samples treated with the test method. Two drops (about 0.04 mL) of anionic polymer were added to facilitate floc formation. Duplicate analytical samples were taken from each 200 mL wastewater sample. The test results are summarized in Table 8.

TABLE 8

Effectiveness of heavy metal removal using the test method in comparison to the conventional method. The control sample consisted of the wastewater supplemented with nickel sulfamate electroplating solution, without any treatment.

| Sample | Concentration (ppm) | | | |
| --- | --- | --- | --- | --- |
| | Cadmium | Chromium | Nickel | Zinc |
| Control | 0.566 | 11.510 | 588.70 | 0.000 |
| Control | 0.568 | 11.760 | 589.70 | 0.000 |
| Conventional Method | 0.012 | 0.020 | 15.520 | 0.004 |
| Conventional Method | 0.013 | 0.013 | 16.330 | 0.004 |
| Test Method at −300 mV | 0.000 | 0.016 | 74.700 | 0.010 |
| Test Method at −300 mV | 0.000 | 0.016 | 78.500 | 0.010 |

Example 12

Removing a Heavy Metal from a Metal Finishing Wastewater Supplemented with Nickel Sulfamate Electroplating Solution The removal of heavy metal was tested in four 200 mL wastewater samples from traditional metal finishing wastewater. The initial pH and oxidation-reduction potential (ORP) of the wastewater samples were 7.7 and +133 mV, respectively. The wastewater samples were supplemented with nickel sulfamate electroplating solution. Approximately 5 mL of nickel sulfamate was added to 495 mL of the wastewater, to produce a 1:100 dilution. The pH and ORP level in the commingled solution was measured to be 6.9 and +158 mV, respectively. Chromium (VI) reduction was achieved through acidic reduction via application of sulfuric acid (to lower pH to 3.0), followed by the application of metabisulfite. Following the chromium reduction process, the pH of the solution was raised to approximately 7.0 using caustic, after which the test formulation including sodium aluminate (e.g., formulations 1, 2, 4, and 5; see Table 2) was added. Formulation 5 was used in particular trials.

Once the ORP was measured to be −300 mV, the pH was adjusted to 9.0 through the addition of caustic. Three drops (about 0.06 mL) of alum were added to each of the samples treated with the test method. Two drops (about 0.04 mL) of anionic polymer were added to facilitate floc formation. Duplicate analytical samples were taken from each 200 mL wastewater sample. The test results are summarized in Table 9.

TABLE 9

Effectiveness of heavy metal removal using the test method in comparison to the conventional method. The control sample consisted of the wastewater supplemented with nickel sulfamate electroplating solution, without any treatment.

| Sample | Concentration (ppm) | | | |
| --- | --- | --- | --- | --- |
| | Cadmium | Chromium | Nickel | Zinc |
| Control | 0.000 | 4.280 | 436.40 | 0.001 |
| Control | 0.000 | 4.340 | 439.80 | 0.001 |
| Conventional Method | 0.000 | 0.052 | 20.19 | 0.006 |
| Conventional Method | 0.001 | 0.041 | 15.90 | 0.005 |
| Test Method at −300 mV | 0.000 | 0.045 | 0.259 | 0.008 |
| Test Method at −300 mV | 0.001 | 0.042 | 0.264 | 0.007 |

The results indicated that, in the presence of sulfamic acid chelator, the novel method was effective in removing all regulated metals from solution to their discharge limit. An alkaline solution facilitated effective metal removal. The conventional treatment method could not achieve nickel removal to levels required by the current regulatory permit, regardless of solution pH.

Example 13

Removing a Heavy Metal from a Wastewater Containing Nickel Sulfamate

A method was performed to remove heavy metals from a wastewater containing nickel sulfamate, and the removal efficiency obtained with this method was compared to that of a conventional method. Each experiment was performed twice.

The wastewater was adjusted to pH of about 7. A test chemical formulation including sodium aluminate (e.g., formulations 1, 2, 4, and 5; see Table 2) was added to the wastewater to an oxidation reduction potential of about −400 mV, while the pH was about 8.5. Formulation 5 was used in particular trials. Once the target ORP was achieved, anionic polymer was added. Then, the treated wastewater was processed through a conventional clarifier for solid/liquid separation.

The conventional method included performing acidic reduction of chromium (VI) through the addition of sulfuric acid to achieve a pH of 3, followed by addition of the strong reductant metabisulfite, addition of a solution of sodium hydroxide to raise the pH to 9, and addition of an anionic polymer to accelerate the flocculation of heavy metal hydroxide.

Figures 3A, 3B:
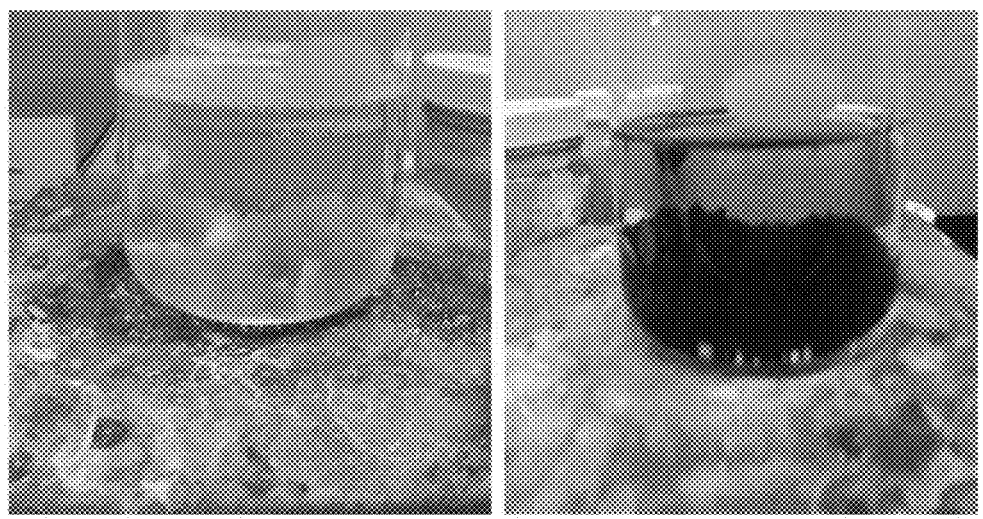
FIG. 3 includes two photographs showing comparative results of treatment of a wastewater in Example 12 with a conventional method (FIG. 3A) and an exemplary method according to some embodiments (FIG. 3B).

FIG. 3 displays comparative results of the conventional method and the test method, indicating that chromium (VI) reduction was achieved through acidic reduction to chromium (III) using sodium metabisulfite. The test method was comparable to the conventional method with regard to chromium removal. However, the test method was much more effective than the conventional method in destabilizing the Ni-chelating agent complex and removing nickel from the wastewater. Table 10.

TABLE 10

Effectiveness of heavy metal removal using the test method in comparison to the conventional method.

| Sample | Concentration (ppm) | | | | | |
| --- | --- | --- | --- | --- | --- | --- |
| | Ar | Cd | Cr | Ni | Se | Zn |
| Control | 0.000 | 0.000 | 1.119 | 677.900 | 0.040 | 0.003 |
| Control | 0.000 | 0.000 | 1.126 | 693.100 | 0.053 | 0.001 |
| Conventional Method | 0.000 | 0.000 | 0.009 | 3.854 | 0.005 | 0.002 |
| Conventional Method | 0.000 | 0.001 | 0.008 | 2.460 | 0.003 | 0.006 |
| Test Method at −300 mV | 0.000 | 0.000 | 0.025 | 0.249 | 0.000 | 0.003 |
| Test Method at −300 mV | 0.000 | 0.000 | 0.017 | 0.220 | 0.033 | 0.003 |

Example 14

Removing a Heavy Metal from a Wastewater Containing Nickel Sulfamate

A method was performed to remove heavy metals from a wastewater containing nickel sulfamate, and the removal efficiency obtained with this method was compared to that of a conventional method. Each experiment was performed twice.

A 500 mL mixture of traditional metal finishing wastewater was commingled with nickel sulfamate (volumetric ratio of 1:20). The test results are summarized in Table 11. In both the conventional method and test method (utilizing a formulation including sodium aluminate, for example, formulations 1, 2, 4, and 5; see Table 2), hexavalent chromium reduction was achieved through acidic reduction using sodium metabisulfite, to form trivalent chromium. Formulation 5 was used in particular trials.

TABLE 11

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 1.191 | 12.860 | 977.00 | 0.000 | 0.001 |
| Control | 0.000 | 1.191 | 12.850 | 976.50 | 0.026 | 0.000 |
| Conventional Method | 0.031 | 0.030 | 0.004 | 35.81 | 0.024 | 0.016 |
| Conventional Method | 0.016 | 0.026 | 0.002 | 31.36 | 0.030 | 0.006 |
| Test Method at −300 mV | 0.021 | 0.002 | 0.002 | 2.477 | 0.006 | 0.006 |
| Test Method at −300 mV | 0.020 | 0.002 | 0.003 | 2.139 | 0.020 | 0.005 |

The results indicated that the test method was more effective in reducing both the cadmium and nickel concentrations compared to the conventional method. The test method produced an over 99% reduction in nickel concentration.

Example 15

Removing a Heavy Metal from a Wastewater Containing Nickel Sulfamate

A method was performed to remove heavy metals from a wastewater containing nickel sulfamate, and the removal efficiency obtained with this method was compared to that of a conventional method. Each experiment was performed twice.

A 500 mL mixture of traditional metal finishing wastewater was commingled with nickel sulfamate (volumetric ratio of 1:20). The test results are summarized in Table 12. In both the conventional method and test method (utilizing a formulation including sodium aluminate, for example, formulations 1, 2, 4, and 5; see Table 2), hexavalent chromium reduction was achieved through acidic reduction using sodium metabisulfite, to form trivalent chromium. Formulation 5 was used in particular trials.

TABLE 12

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 1.169 | 9.217 | 1045.00 | 0.032 | 0.030 |
| Control | 0.000 | 1.169 | 9.045 | 1044.00 | 0.022 | 0.034 |
| Conventional Method | 0.000 | 0.018 | 0.002 | 23.07 | 0.000 | 0.006 |
| Conventional Method | 0.009 | 0.019 | 0.002 | 24.39 | 0.007 | 0.003 |
| Test Method at −350 mV | 0.017 | 0.000 | 0.003 | 0.298 | 0.000 | 0.004 |
| Test Method at −350 mV | 0.018 | 0.000 | 0.004 | 0.999 | 0.003 | 0.003 |

The results indicated that reducing the ORP level did have a beneficial impact on the removal of nickel from solution. To determine if a larger floc concentration could influence the extent to which nickel could be removed from solution, the above testing was repeated under high solids conditions. A larger floc formation could potentially remove more colloidal suspensions of nickel that may pass through the filter. Additional chromium was added to encourage the formation of flocculent solids.

Example 16

Removing a Heavy Metal from a Wastewater Containing Nickel Sulfamate and Chromium Plating Solution A 500 mL mixture of traditional metal finishing wastewater was commingled with nickel sulfamate (volumetric ratio of 1:20). To this mixture, 0.5 mL of chromium plating solution was added. The solution was then treated via either a conventional treatment method or a test method (utilizing a formulation including sodium aluminate, for example, formulations 1, 2, 4, and 5; see Table 2). Formulation 5 was used in particular trials. In both the conventional and test methods, hexavalent chromium reduction was achieved through acidic reduction to trivalent chromium, using sodium metabisulfite. The test results are summarized in Table 13.

TABLE 13

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 0.053 | 109.60 | 1101.00 | 0.101 | 0.000 |
| Control | 0.000 | 0.081 | 110.50 | 1101.00 | 0.049 | 0.000 |
| Conventional Method | 0.017 | 0.000 | 0.016 | 28.03 | 0.018 | 0.003 |
| Conventional Method | 0.022 | 0.000 | 0.012 | 30.36 | 0.027 | 0.003 |
| Test Method at −350 mV | 0.032 | 0.000 | 0.016 | 0.285 | 0.032 | 0.002 |
| Test Method at −350 mV | 0.034 | 0.000 | 0.022 | 0.113 | 0.032 | 0.001 |

The results indicated that increasing the level of flocculent solids improved the overall efficiency in regulated metal removal. With the addition of chromium hydroxide solids, nickel removal efficiency was improved, resulting in effluent nickel levels that were well below the regulated discharge limit of 0.6 ppm. This indicated that removal of nickel colloids was enhanced in the presence of a larger concentration of solids.

Example 17

Removing a Heavy Metal from a Wastewater Containing Nickel Sulfamate and Chromium Plating Solution A 500 mL mixture of a traditional metal finishing wastewater was commingled with nickel sulfamate (volumetric ratio of 1:20). To this mixture, 0.5 mL of chromium plating solution was added. The solution was then treated via either a conventional treatment method or a test method (utilizing a formulation including sodium aluminate, for example, formulations 1, 2, 4, and 5; see Table 2). Formulation 5 was used in particular trials. No sodium metabisulfite was used to treat hexavalent chromium. Instead, the pH of the wastewater sample was raised to 7.5 using caustic, and the test formulation was added to treat all regulated heavy metals. The test results are summarized in Table 14.

TABLE 14

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 0.000 | 118.60 | 1210.00 | 0.061 | 0.000 |
| Control | 0.000 | 0.000 | 118.50 | 1203.00 | 0.046 | 0.000 |
| Conventional Method | 0.038 | 0.000 | 0.011 | 17.51 | 0.013 | 0.004 |
| Conventional Method | 0.028 | 0.000 | 0.010 | 16.89 | 0.000 | 0.004 |
| Test Method at −400 mV | 0.026 | 0.000 | 0.008 | 0.403 | 0.000 | 0.001 |
| Test Method at −400 mV | 0.014 | 0.000 | 0.009 | 0.461 | 0.007 | 0.001 |

The results indicated that the test method was effective in removing all regulated heavy metals including chromium, without the need for sodium metabisulfite. The test formulation sufficiently achieved the reduction of hexavalent chromium through sulfide reducing chemistry. To achieve effective chromium reduction, sufficient amount of the test formulation was added to reduce the ORP to −400 mV. At this level, hexavalent chromium is removed through sulfide precipitation chemistry. The conventional method could achieve similar removal efficiencies for chromium, but it was unable to reduce nickel concentrations to below their regulatory discharge standard.

Example 18

Removing a Heavy Metal from a Wastewater Containing Nickel Sulfamate and Chromium Plating Solution A 500 mL mixture of traditional metal finishing wastewater was commingled with nickel sulfamate (volumetric ratio of 1:20). To this mixture, 0.5 mL of chromium plating solution was added. The solution was then treated via either a conventional treatment method or test method (utilizing a formulation including sodium aluminate, for example, formulations 1, 2, 4, and 5; see Table 2). Formulation 5 was used in particular trials. No sodium metabisulfite was used to treat hexavalent chromium. Instead, the pH of the wastewater sample was raised to 7.5 using caustic, and the disclosed formulation was added to lover the ORP to −400 mV. The test results are summarized in Table 15.

TABLE 15

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 1.021 | 111.20 | 1226.00 | 0.075 | 0.000 |
| Control | 0.000 | 1.038 | 113.80 | 1222.00 | 0.057 | 0.000 |
| Conventional Method | 0.028 | 0.005 | 0.023 | 7.037 | 0.053 | 0.005 |
| Conventional Method | 0.020 | 0.003 | 0.010 | 6.666 | 0.024 | 0.002 |
| Test Method at −400 mV | 0.020 | 0.000 | 0.021 | 0.089 | 0.008 | 0.003 |
| Test Method at −400 mV | 0.012 | 0.000 | 0.027 | 0.022 | 0.022 | 0.001 |

The results indicated that the test method had the ability to treat hexavalent chromium, as well as nickel, when the ORP level was lowered to −400 mV. Furthermore, the metal removal efficiencies were achieved without the removal of chelating substances associated with nickel sulfamate.

Example 18

Removing a Heavy Metal from a Wastewater Containing Electroless Nickel Electroplating Solution A method was performed to remove heavy metals from a wastewater containing electroless nickel electroplating solution, and the removal efficiency obtained with this method was compared to that of a conventional method. Each experiment was performed twice.

The wastewater was adjusted to pH of about 7. A test chemical formulation including sodium aluminate (e.g., formulations 1, 2, 4, and 5; see Table 2) was added to the wastewater to an oxidation reduction potential of about −400 mV, while the pH was about 8.5. Formulation 5 was used in particular trials. Once the target ORP was achieved, anionic polymer was added. Then, the treated wastewater was processed through a conventional clarifier for solid/liquid separation.

The conventional method included performing acidic reduction of chromium (VI) through the addition of sulfuric acid to achieve a pH of 3, followed by addition of the strong reductant metabisulfite, addition of a solution of sodium hydroxide to raise the pH to 9, and addition of an anionic polymer to accelerate the flocculation of heavy metal hydroxide.

The test method was effective in reducing all heavy metal contents to below the regulatory discharge standard, even when the wastewater was treated with a test chemical formulation that contained no metabisulfite reducing agent. Table 16.

Furthermore, the test method could achieve the reduction of chromium (VI) through sulfide reducing chemistry. The conventional metal hydroxide method was unable to reduce nickel concentrations to below the regulatory discharge standard of 0.6 ppm. Table 16.

TABLE 16

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 0.146 | 1.314 | 50.480 | 0.026 | 0.014 |
| Control | 0.000 | 0.146 | 1.133 | 51.360 | 0.043 | 0.014 |
| Conventional Method | 0.000 | 0.019 | 0.030 | 6.418 | 0.032 | 0.000 |
| Conventional Method | 0.000 | 0.020 | 0.030 | 6.625 | 0.005 | 0.001 |
| Test Method at −400 mV | 0.001 | 0.001 | 0.025 | 0.274 | 0.120 | 0.005 |
| Test Method at −400 mV | 0.000 | 0.002 | 0.028 | 0.331 | 0.098 | 0.005 |

Example 20

Removing a Heavy Metal from a Wastewater Containing Electroless Nickel Electroplating Solution A 500 mL mixture of traditional metal finishing wastewater was commingled with electroless nickel plating bath solution (volumetric ratio of 1:50). No sodium metabisulfite was used to treat hexavalent chromium. Instead, the pH of the solution was raised to 7.5 using caustic, and the test formulation including sodium aluminate (e.g., formulations 1, 2, 4, and 5; see Table 2) was added to lower the ORP to −400 mV. Formulation 5 was used in particular trials. Once the target ORP was achieved, anionic polymer was added. The test results are summarized in Table 17.

TABLE 17

Effectiveness of heavy metal removal using the test method in comparison to a conventional method.

| Sample | Concentration (ppm) | | | | | |
|---|---|---|---|---|---|---|
| | Ar | Cd | Cr | Ni | Se | Zn |
| Control | 0.000 | 0.066 | 1.204 | 88.310 | 0.044 | 0.032 |
| Control | 0.000 | 0.065 | 1.214 | 94.360 | 0.059 | 0.023 |
| Conventional Method | 0.016 | 0.007 | 0.040 | 8.751 | 0.101 | 0.008 |
| Conventional Method | 0.008 | 0.009 | 0.036 | 6.157 | 0.065 | 0.005 |
| Test Method at −400 mV | 0.007 | 0.000 | 0.020 | 0.564 | 0.429 | 0.011 |
| Test Method at −400 mV | 0.002 | 0.001 | 0.018 | 0.374 | 0.255 | 0.010 |

The results demonstrated that by maintaining an ORP of −400 mV, the test method was capable of removing cadmium, chromium, and nickel to below their compliance discharge limits, without the addition of sodium metabisulfite. The conventional method was unable to reduce the nickel concentrations to the regulatory levels in the presence of chelating substances associated with electroless nickel plating bath solutions Example 21

Removing a Heavy Metal from a Wastewater Containing Electroless Nickel Electroplating Solution A 500 mL mixture of traditional metal finishing wastewater was commingled with electroless nickel plating bath solution (volumetric ratio of 1:20). No sodium metabisulfite was used to treat hexavalent chromium. Instead, the pH of the solution was raised to 7.5 using caustic, and a test formulation including sodium aluminate (e.g., formulations 1, 2, 4, and 5; see Table 2) was added to lower the ORP to −400 mV. Formulation 5 was used in particular trials. Once the target ORP was achieved, anionic polymer was added. The test results are summarized in Table 18.

TABLE 18

Effectiveness of heavy metal removal using the test method in comparison to a conventional method.

| Sample | Concentration (ppm) | | | | | |
|---|---|---|---|---|---|---|
| | Ar | Cd | Cr | Ni | Se | Zn |
| Control | 0.000 | 0.191 | 6.749 | 265.700 | 0.043 | 0.141 |
| Control | 0.000 | 0.179 | 6.465 | 257.100 | 0.029 | 0.104 |
| Conventional Method | 0.000 | 0.001 | 0.035 | 74.240 | 0.025 | 0.004 |
| Conventional Method | 0.000 | 0.000 | 0.035 | 76.060 | 0.020 | 0.004 |
| Test Method at −400 mV | 0.000 | 0.000 | 0.310 | 0.241 | 0.144 | 0.006 |
| Test Method at −400 mV | 0.000 | 0.000 | 0.309 | 0.168 | 0.085 | 0.004 |

The results indicated that the test method could reduce hexavalent chromium without using metabisulfite. By maintaining an ORP of −400 mV or lower, the test method was found to be effective in removing hexavalent chromium, as well as other regulated heavy metals, to below their regulatory discharge limit.

Example 22

Removing a Heavy Metal from a Wastewater Containing Electroless Nickel Electroplating Solution A 500 mL mixture of traditional metal finishing wastewater was commingled with electroless nickel plating bath solution (volumetric ratio of 1:10). No sodium metabisulfite was used to treat hexavalent chromium. Instead, the pH of the solution was raised to 7.5 using caustic, and a test formulation including sodium aluminate (e.g., formulations 1, 2, 4, and 5; see Table 2) was added to lower the ORP to −400 mV. Formulation 5 was used in particular trials. Once the target ORP was achieved, anionic polymer was added. The test results are summarized in Table 19.

TABLE 19

Effectiveness of heavy metal removal using the test method in comparison to the conventional method.

| Sample | Concentration (ppm) | | | | | |
|---|---|---|---|---|---|---|
| | Ar | Cd | Cr | Ni | Se | Zn |
| Control | 0.000 | 0.258 | 1.989 | 356.100 | 0.057 | 0.152 |
| Control | 0.000 | 0.270 | 2.068 | 368.400 | 0.072 | 0.222 |
| Conventional Method | 0.000 | 0.006 | 0.080 | 113.400 | 0.074 | 0.015 |
| Conventional Method | 0.000 | 0.004 | 0.043 | 89.410 | 0.036 | 0.005 |
| Test Method at −400 mV | 0.000 | 0.001 | 0.150 | 0.352 | 0.069 | 0.004 |
| Test Method at −400 mV | 0.000 | 0.002 | 0.161 | 0.323 | 0.058 | 0.005 |

The results indicated that even at large concentrations of chelating substances, the test method was able to reduce all regulated heavy metals to below their compliance discharge standard.

The invention claimed is:
1. A chemical formulation for removing a heavy metal from a waste solution containing a chelating agent, the chemical formulation comprising, based on the total weight of the chemical formulation:
   from about 40% to about 45% of an alkaline sulfide solution and/or alkaline earth sulfide solution at about 45% solids;
   from about 0% to about 10% of an alkaline hydroxide solution and/or alkaline earth hydroxide solution at about 45% solids;
   from about 10% to about 20% of a sodium aluminate at about 40% solids; and
   water,
      wherein the chemical formulation has pH of between about 10 and about 13.5, and
      wherein the chemical formulation does not comprise either an oxidizing agent or a dithiocarbamate-based compound.
2. The chemical formulation of claim 1, wherein the chemical formulation comprises, based on the total weight of the chemical formulation, from about 25% to about 50% water.
3. The chemical formulation of claim 1, wherein the alkaline sulfide and/or alkaline earth sulfide of the alkaline sulfide and/or alkaline earth sulfide solution is selected from the group consisting of sodium sulfide, potassium sulfide, calcium sulfide, and a combination of any thereof.
4. The chemical formulation of claim 3, wherein the alkaline sulfide and/or alkaline earth sulfide is sodium sulfide flake.

5. The chemical formulation of claim 1, wherein the alkaline hydroxide or alkaline earth hydroxide of the alkaline hydroxide solution and/or alkaline earth hydroxide solution is selected from the group consisting of sodium hydroxide, calcium hydroxide, potassium hydroxide, magnesium hydroxide, and a combination of any thereof.

6. A chemical formulation for removing a heavy metal from a waste solution containing a chelating agent, the chemical formulation consisting essentially of, based upon the total weight of the chemical formulation:
from about 40% to about 45% of an alkaline sulfide solution and/or alkaline earth sulfide solution at about 45% solids;
from about 0% to about 10% of an alkaline hydroxide solution and/or alkaline earth hydroxide solution at about 45% solids;
from about 10% to about 20% of a sodium aluminate at about 40% solids; and
water,
wherein the chemical formulation has pH of between about 10 and about 13.5.

7. A kit of parts comprising:
the chemical formulation of claim 1; and
at least one of a coagulant and/or flocculant.

8. The kit of parts of claim 7, wherein the kit comprises alum coagulant or polymeric flocculant.

9. The kit of parts of claim 8, wherein the kit comprises both alum coagulant and polymeric flocculant.

10. The kit of parts of claim 7, wherein the kit comprises alum coagulant or anionic polyacrylamide flocculant.

11. The kit of parts of claim 7, wherein the kit comprises a coagulant selected from the group consisting of aluminum sulfate, aluminum chloride, sodium aluminate, polyaluminum chloride, activated silica, ferric chloride, ferric hydroxide, a ferrous salt, calcium chloride, magnesium chloride, colloidal clay, and a combination of any thereof.

12. The kit of parts of claim 7, wherein the kit comprises a flocculant selected from the group consisting of anionic polymeric flocculant, cationic polymeric flocculant, non-ionic polymeric flocculant, inorganic flocculant, and a combination of any thereof.

13. The kit of parts of claim 7, wherein the kit comprises a flocculant in an amount from about 0.5 ppm to about 10 ppm.

14. A method for removing a heavy metal from a waste solution containing a chelating agent, the method comprising:
treating the waste solution, at an oxidation reduction potential of about −190 mV to about −450 mV and pH of from about 7 to about 10, with the chemical formulation of claim 1; and
separating a solid precipitate containing the heavy metal from a treated waste solution.

15. The method according to claim 14, wherein the method further comprises:
introducing into the treated waste solution at least one coagulant and/or flocculant.

16. The method according to claim 14, wherein the method further comprises:
generating a waste effluent.

17. The method according to claim 16, wherein the method further comprises:
treating the waste effluent with at least one of organic adsorbent and inorganic adsorbent.

18. The method according to claim 14, wherein the heavy metal is selected from the group consisting of iron, chromium, copper, nickel, zinc, lead, silver, cadmium, rhodium, barium, gold, platinum, palladium, tin, molybdenum, tungsten, manganese, arsenic, vanadium, bismuth, beryllium, mercury, cobalt, barium, antimony, selenium, thallium, thorium, uranium, and a combination of any thereof.

19. The method according to claim 14, wherein the chelating agent is selected from the group consisting of alkylenepolyamine polyacetic acid and salt thereof, salt of alkylenepolyamine polyacetic acid, nitrilotriacetic acid (NTA), thiosulfate, iminodiacetic acid, alkylenepolyamino polycarboxylic acid, citric acid, gluconate, and a combination of any thereof.

20. The method according to claim 14, wherein the oxidation reduction potential is from about −300 mV to about −450 mV.

21. The method according to claim 14, wherein the method is a continuous process in which the heavy metal is continuously removed from a flowing stream of the waste solution.

22. The method according to claim 14, wherein the waste solution is produced by a process selected from the group consisting of chemical metal cleaning; military installation; manufacturing of printed circuit boards; manufacturing of steels; manufacturing of chrome finishes, aircrafts, automobiles or ships; manufacturing of batteries; manufacturing of chemicals; manufacturing of semiconductors; manufacturing of medical equipment; manufacturing of dietary food supplements; photographic or X-ray processing; electronic plating; titanium pickle operations; electroless nickel operations; aluminum anodizing operations; metal plating and finishing; and mining.

23. A method for removing a heavy metal from a waste solution containing a chelating agent, the method comprising:
treating the waste solution, at an oxidation reduction potential of about −190 mV to about −450 mV and pH of from about 7 to about 10, with the chemical formulation of claim 6; and
separating a solid precipitate containing the heavy metal from the waste solution.

* * * * *